(12) United States Patent
Lenz

(10) Patent No.: US 7,221,396 B2
(45) Date of Patent: May 22, 2007

(54) DIGITAL CAMERA HAVING CMOS IMAGE SENSOR WITH IMPROVED DYNAMICS AND METHOD FOR CONTROLLING A CMOS IMAGE SENSOR

(76) Inventor: Reimar Lenz, Wilhelmstraβe 4, 80801 München (DE)

( * ) Notice: Subject to any disclaimer, the term of this patent is extended or adjusted under 35 U.S.C. 154(b) by 1071 days.

(21) Appl. No.: 10/084,967

(22) Filed: Mar. 1, 2002

(65) Prior Publication Data
US 2002/0122126 A1 Sep. 5, 2002

(30) Foreign Application Priority Data
Mar. 2, 2001 (DE) .................................. 101 10 108

(51) Int. Cl.
*H04N 3/14* (2006.01)
*H04N 5/217* (2006.01)
*H04N 9/64* (2006.01)

(52) U.S. Cl. .................... 348/297; 348/241; 348/243
(58) Field of Classification Search .................... None
See application file for complete search history.

(56) References Cited
U.S. PATENT DOCUMENTS

| | | | |
|---|---|---|---|
| 5,742,047 A | 4/1998 | Buhler et al. | |
| 5,877,715 A | 3/1999 | Gowda et al. | |
| 6,111,242 A | 8/2000 | Afghahi | |
| 6,115,066 A * | 9/2000 | Gowda et al. | 348/308 |
| 6,493,030 B1 * | 12/2002 | Kozlowski et al. | 348/310 |
| 6,831,686 B1 * | 12/2004 | Koren et al. | 348/243 |
| 6,831,689 B2 * | 12/2004 | Yadid-Pecht | 348/297 |
| 6,888,572 B1 * | 5/2005 | Kozlowski | 348/308 |
| 2004/0212704 A1 * | 10/2004 | Bell et al. | 348/241 |

\* cited by examiner

*Primary Examiner*—David Ometz
*Assistant Examiner*—Luong T. Nguyen
(74) *Attorney, Agent, or Firm*—Crowell & Moring LLP

(57) ABSTRACT

In a CMOS image sensor, correlated double sampling (CDS) is performed to reduce RESET noise: a first sampled signal is detected after RESET for the pixels, a second sampled value is determined at the end of an exposure time, and a differential signal substantially free from RESET noise is formed by subtracting the first sampled value from the second sampled value. In order to improve the deficient brightness dynamics, the first sampled signal is obtained only after a certain delay interval according to the invention so that this signal too contains not only a noise component but also brightness information. If the second sampled signal exceeds the saturation limit, only the accordingly scaled first sampled signal is used as the wanted signal. In this case the wanted signal has RESET noise but the latter is of almost no importance at high brightnesses. One achieves a multiplication of the brightness dynamics of a CMOS image sensor.

14 Claims, 1 Drawing Sheet

Figure 1:
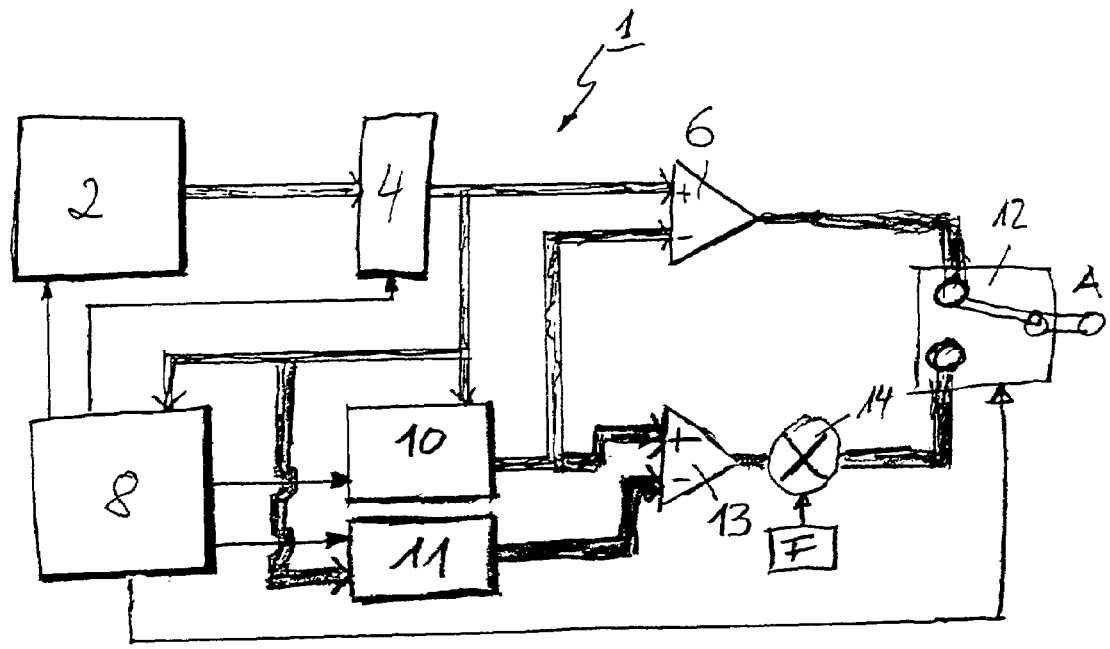

DIGITAL CAMERA HAVING CMOS IMAGE SENSOR WITH IMPROVED DYNAMICS AND METHOD FOR CONTROLLING A CMOS IMAGE SENSOR

This invention relates to a digital camera having a CMOS image sensor with a plurality of pixels each storing within an exposure time a brightness-dependent charge which is outputted as a pixel signal under the control of a control device, a correction device which, after a pixel RESET of the image sensor, forms the difference from first and second sampled values detected toward the onset and end of the exposure time for the pixels, and outputs the second sampled value reduced by the first sampled value as the wanted signal.

The invention also relates to a method for controlling a CMOS image sensor.

For digital cameras and the like for example, CCD image sensors have been known for some time. There are also CMOS image sensors, which have poorer brightness dynamics compared to CCD image sensors. The term "brightness dynamics" refers to the ratio between saturation signal amplitude of the exposed image sensor and its noise signal amplitude when the sensor is unexposed. Unless otherwise stated here, all remarks relate to any pixel of the image sensor wherein a plurality of pixels are disposed in rows and columns.

With the image sensors in question here, a certain quantity of electricity is collected within a certain exposure time in each pixel of the image sensor. The charge is converted to a voltage with the aid of a capacitor. The quantity of electricity that can be taken up by a pixel has an upper limit. With a predetermined exposure time there is a certain brightness at which the collected quantity of electricity just reaches the upper limit. At greater brightness the upper limit for the collectable quantity of electricity is already reached earlier, so that the level of the wanted signal obtained at the end of the exposure time no longer says anything about the quantity of light taken up.

There are several noise sources for an unexposed sensor. Besides (thermal) system noise and dark current noise, there is so-called RESET noise, also known as kTC noise. At the onset of an exposure time a RESET signal is applied to the pixels to drain charges stored in the pixel up to then. But the relevant pixel also delivers a signal di-directly after a RESET process, namely the noise signal. This kTC noise constitutes the predominant noise component. With CMOS image sensors there is additionally the switch-over noise of the column multiplexer. When the sensor is exposed there is also photon noise.

In addition to the stated noise signals, a CMOS image sensor has a time-constant noise source. It has the form of dark value offsets. This noise is frequently also known by the rather incorrect name of "fixed pattern noise"; it does not involve a fluctuation noise source but a time-constant noise source. This noise varies from pixel to pixel and can be taken into account in simple fashion, as explained in more detail below.

In order to suppress falsification of the wanted signal in image sensors by RESET noise, it is known to correct the signal sampled value obtained at the end of the exposure time by subtracting a noise sampled value from said sampled value. For this purpose, a first sampled value corresponding primarily to the RESET noise is obtained directly after the RESET signal. The first sampled value is then subtracted from the second sampled value obtained at the end of the exposure time. Since both sampled values have the same RESET noise, the differential signal is substantially free from the RESET noise.

For the prior art, reference is made for example to U.S. Pat. Nos. 5,742,047; 6,111,242; 6,115,066 and 5,877,715. The above-described method of forming a difference for correcting the wanted signal is also described for CMOS image sensors therein. The subtraction can be performed using analog signals, but it is also possible to process the signals digitally, in particular in CMOS image sensors since these sensors have a separate charge-to-voltage converter capacitor for each pixel. It is then expedient to have an image memory for storing the total dark image information for all pixels in digital form. The stored dark image digitized with the aid of an analog-to-digital converter is then subtracted pixel by pixel from the digital image in accordance with the sampling performed at the end of the exposure time.

The abovementioned method with correction by subtraction of two sampled values is known from the prior art, being referred to therein as correlated double sampling (CDS). The stated prior art already discloses said CDS method for CMOS image sensors. However, the effort necessary for the digital CDS method is so great that it is that it is usually dispensed with. For this reason, imaging systems with CMOS sensors have the reputation of low dynamics.

The invention is based on the problem of providing a digital camera of the abovementioned kind which has higher brightness dynamics compared to the prior art.

A method is also to be provided that creates a precondition for improving the dynamics of a CMOS image sensor.

This is obtained in a digital camera of the abovementioned type by the control device delaying the sampling for the first sampled value by a predetermined delay time after the RESET.

The invention is based on some basic findings which shall be discussed in more detail in the following.

Firstly, in the prior art it is assumed that the first sampled value obtained is a mere noise signal containing no image information whatsoever, and subtracting this pure noise signal from the second sampled value then substantially yields the pure image information. The noise signal caused by kTC noise is a random signal which has an amplitude frozen during the RESET process and remaining unchanged throughout the following exposure time. Accordingly, a first sampled signal obtained with a delay after the RESET thus also contains precisely the noise signal component caused by kTC noise and corresponding to the noise signal obtained at RESET time. Subtracting the first sampled signal—obtained with a delay after RESET according to the invention—from the second sampled signal thus likewise yields a wanted signal free from kTC noise.

The image component contained in the first sampled signal obtained with a delay gets lost in the subtraction process, but this loss is negligible in view of the multiplied brightness dynamics, as explained in more detail below.

Secondly, as mentioned above, when the image sensor is exposed there is photon noise as well as the various other noise components. At high brightness, in particular brightnesses at which the CMOS image sensor tends to saturate, the photon noise component is so great that it overshadows kTC noise, which is independent of brightness. For this reason, kTC noise plays a minor part in image signals caused by high brightness.

Subtracting the first sampled value from the second sampled value obtained at the end of the exposure time yields a signal free from RESET noise, but this signal is reduced somewhat, i.e. by the image information component, in comparison to the prior art, where the first sampled value is detected directly after RESET. If, as provided in a preferred embodiment of the invention, the delay time is selected so as to correspond to about 1 percent to 20 percent, preferably 2 percent to 10 percent, of the total exposure time, the amplitude of the wanted signal is reduced due to the subtraction by about this percentage in normal operation.

In exchange, however, a considerable advantage is obtained, namely greater brightness dynamics of the image sensor. When a pixel saturates, i.e. reaches its upper possible charge limit, very fast at high brightness, the wanted signal from said pixel is useless since the saturation signal contains practically no more information about how strong the exposure within the exposure time was.

According to the invention, the first sampled signal can be used as the information source in such situations. The first sampled signal still has RESET noise—which is negligible at high brightnesses—but it also contains an information signal component, the signal amplitude being falsified by the fact that the exposure time for the first sampled signal corresponds only to the delay time. Since both the original exposure time and the delay time are known, however, the first sampled signal can be multiplied by a corresponding factor to extrapolate the first sampled value to a value corresponding to a signal at full original exposure time.

The above considerations also show that the low signal amplitude of the first sampled value provides considerable latitude up to which said first sampled signal can be used as the information signal even at extremely high brightnesses. If the delay time corresponds for example to 10 percent of the actual exposure time, the brightness dynamics of the image sensor can be improved by approximately a factor of ten, assuming the second sampled value corresponds to the saturation signal amplitude. The first sampled value would also reach the saturation limit only at such high brightness.

To permit the first sampled value to be actually used, in a preferred embodiment of the invention, the second sampled value can be compared with a threshold value. If the sampled value is higher than the threshold value, the first sampled value can be multiplied by a corresponding scaling factor (derived from the ratio of actual exposure time to delay time) and the resulting value used as the wanted signal.

Alternatively, an expected value for the second sampled value can be determined from the first sampled value using the scaling factor. If said expected value is above a certain threshold value, the wanted signal can then be determined from the first sampled value in the above-described fashion.

At low and medium brightnesses the inventive digital camera can thus work like a conventional camera, while at medium and higher brightnesses it works in a new operating mode wherein the wanted signal determined by the CDS method is replaced by a wanted signal derived only from the first sampled value.

In practice, undesirable edges or steps might occur in the image, i.e. if there is a sudden transition from one operating mode to the other. For this reason it is provided according to the invention that the transition between the two abovementioned modes takes place gradually or fluidly. Accordingly, the following is outputted as the wanted signal in accordance with the brightness derived from the first and/or second sampled value:

a) in a low brightness range: the difference of the sampled values;
 b) in a high brightness range: the value derived solely from the first sampled value; and
 c) in a medium brightness range: a weighted mixed value obtained from the values according to a) and b).

The abovementioned fixed pattern noise, which is actually a time-constant noise source and not fluctuation noise, is taken into account according to the invention by providing a dark value offset memory and subtracting from the first sampled value of a particular pixel an offset value belonging to said pixel and prestored in the dark value offset memory. The offset values for the pixels of the CMOS image sensor can be stored before the first use of the digital camera by taking a picture with the sensor unexposed, said values then being subtracted from the first sampled values of corresponding pixels at each image output. Storage of the dark value offsets can also be repeated from time to time to update the values.

The invention also provides a method for controlling a CMOS image sensor by the so-called CDS method wherein pixels of the image sensor are sampled toward the onset and end of an exposure time, and a wanted signal is obtained by subtracting the first sampled value from the second sampled value, it being provided according to the invention that the first sampled value is obtained with usable image information after a predetermined delay time after RESET.

Figure 2:
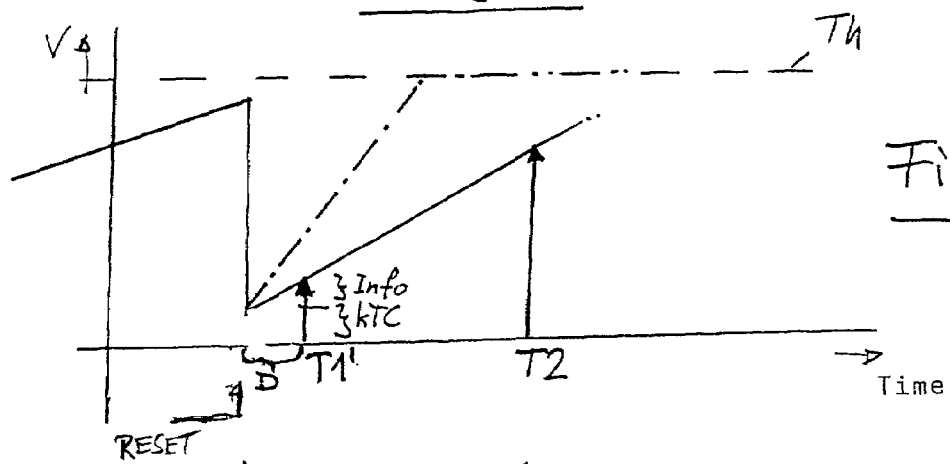
Figure 3:
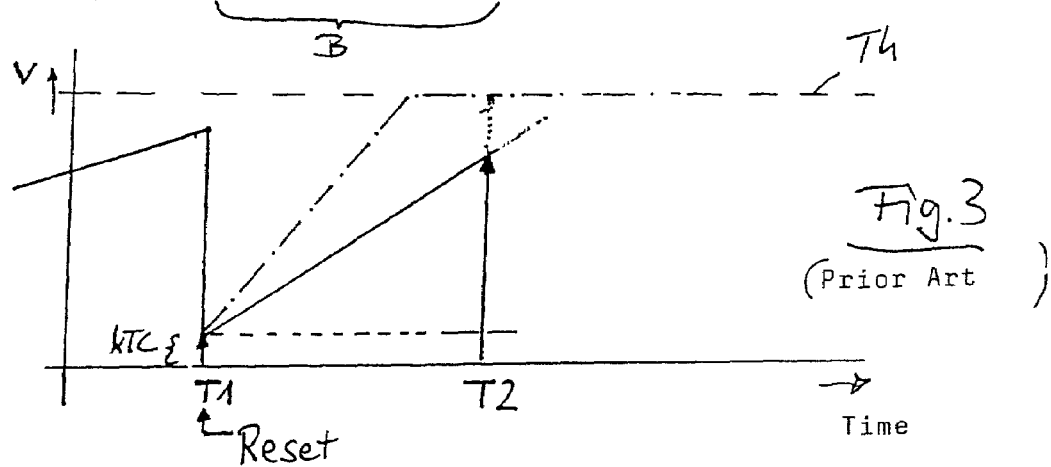

In the following an example of the invention will be explained in more detail with reference to the drawing, in which:

FIG. 1 shows a block diagram of a digital camera with associated electronics for performing a CDS correction, FIG. 2 shows the voltage curve in accordance with the increased quantity of electricity in a pixel of an image sensor according to an embodiment of the invention, and FIG. 3 shows a signal pattern similar to FIG. 2 but for a prior art CMOS image sensor.

FIG. 1 shows electric circuit 1 of a digital camera having CMOS image sensor 2 which is controlled by control device 8 and is upstream of analog-to-digital converter 4. Analog-to-digital converter 4 converts the analog signals from the output of CMOS image sensor 2 into digital values which are then stored in dark image memory 10 under the control of control device 8. The stored values in dark image memory 10 correspond to the digitized voltages for the individual pixels of CMOS sensor element 2. Said voltages are obtained after a RESET signal by a first sampling, controlled by control device 8.

The sampled values obtained and digitized upon a second sampling at the end of an exposure time are formed by subtracter 6 into a differential signal by subtracting the first sampled values stored in dark image memory 10 from the digital second sampled values pixel by pixel and digitally, again under the control of control device 8. The differential signal at the output of subtracter 6 is supplied to wanted signal output A via a first input of switch 12.

The first sampled values stored in dark image memory 10 are also supplied to multiplier 14 where the sampled values are multiplied by scaling factor F.

Before multiplication, each pixel value from dark image memory 100 is corrected with respect to the aforementioned fixed pattern noise. For this purpose, offset values varying for the individual pixels of CMOS image sensor 2 are stored in dark value offset memory 11 for each pixel of CMOS image sensor 2 before the first use of the digital camera. At each readout process for image memory 10 the values are also read out in synchronism from the dark value offset memory. The values from memories 10 and 11 are subtracted by subtracter 13, and the difference value, i.e. the first sampled value free from fixed pattern noise from image memory 10, is supplied to multiplier 14 to be multiplied by scaling factor F.

The multiplied first sampled values are supplied to a second input of switch 12. The position of switch 12 is selected by control device 8, in accordance with an expected value for the second sampled value. Said expected value is calculated from the particular first sampled values by control device 8. If the amplitude of the particular first sampled value is so great that the second sampled value can be expected to be above saturation threshold value Th, control device 8 switches switch 12 to the lower position, so that at wanted signal output A a wanted signal is outputted which is obtained by multiplying the first sampled value by factor F.

FIG. 2 shows a sampling process in detail. Before FIG. 2 is dealt with, the prior art shall be explained with reference to FIG. 3. Reference is made here in particular to the abovementioned U.S. patents, which are regarded as incorporated by reference here, in particular with respect to the correlated double sampling method (CDS method).

According to FIG. 3, a charge collects in one of the pixels and is converted into voltage V by a capacitor not shown here. The higher the brightness to which the pixel in question is exposed, the steeper the rise in voltage. At a given time CMOS image sensor 2 according to FIG. 1 is reset pixel by pixel by a RESET pulse outputted by control device 8. This drains all residual charges from the individual pixels.

Due to the RESET pulse, voltage V sinks abruptly according to FIG. 3 to a certain value which is designated kTC here and corresponds to the noise signal amplitude, mainly due to RESET noise.

According to the continuous line in FIG. 3, voltage V already sampled for the first time at time T1 now rises further, in accordance with the brightness to which the pixel is exposed. After given exposure time B there is a second sampling of voltage V at time T2. The signal amplitude at time T2 likewise has noise signal amplitude kTC. By subtracting the first sampled value obtained at T1 from the second sampled value obtained at T2 the noise signal component is eliminated.

As further shown in FIG. 3 by a dash-dotted line, the voltage would already reach saturation limit Th after about two thirds of exposure time B at somewhat higher brightness on the pixel in question. A sampled value obtained at time T2 would then be useless.

According to FIG. 2, the pixel in question is likewise RESET by the RESET pulse so that the voltage decreases to a noise signal amplitude, likewise designated kTC in FIG. 2.

In contrast to the prior art, however, the first sampling does not take place at or directly after the RESET pulse but at time T1' delayed by predetermined delay time D. At this time the exposure of the pixel has already caused a certain quantity of electricity to collect, corresponding to a certain voltage, designated "Info" in FIG. 2 to indicate that the signal sampled at time T1' contains information about brightness.

When correction by subtraction of the sampled values at T2 and T1' takes place according to FIG. 2, the obtained differential signal is free from noise signal component kTC but is somewhat lower compared to the case shown in FIG. 3, i.e. by the value designated "Info" in FIG. 2.

Let us now consider the case that the brightness on the relevant pixel is so great that signal voltage V rises very steeply in accordance with the dash-dotted line. The second sampled signal obtained at time T2 would then be useless. According to the invention, solely the first sampled signal obtained at time T1' is used as the wanted signal. It is multiplied by scaling factor F, which has the value B/D for instance, in order to take account of the fact that the exposure time at time T1' is greatly reduced compared to the actual exposure time and this reduction must be compensated for.

At output A in FIG. 1 one thus obtains, depending on the brightness, either a differential signal formed by subtracting the first sampled value at T1' from the second sampled value at T2, or a signal obtained from only the first sampled value at T1'.

FIG. 2 indicates that the brightness dynamics of the image sensor according to the invention is many times improved in comparison to the prior art; voltage V would have to rise extremely steeply to reach upper saturation value Th by time T1' of the first sampling.

Switch 12 shown in FIG. 1 permits only the two alternatives, "differential signal," on the one hand, or "wanted signal derived from first sampled value," on the other hand. To avoid image edges or steps one can replace switch 12 according to FIG. 1 with a circuit permitting a fluid transition between the two stated modes. In a medium brightness range a weighted mean value can be formed from the two types of wanted signal, "differential signal" and "wanted signal derived from the first sampled value," the weight being greater in the proximity of the low brightness range for the "differential signal" than for the wanted signal derived from the first sampled value. In the proximity of the high brightness range the distribution of weight is then reversed. This results in a fluid transition between the two modes.

The invention claimed is:

1. A digital camera having a CMOS image sensor (2) with a plurality of pixels each storing within an exposure time (B) a brightness-dependent charge which is outputted as a pixel signal under the control of a control device (8), and a correction device (6, 10) which, after a pixel RESET of the image sensor, forms the difference from first and second sampled values detected toward the onset and end of the exposure time for the pixel, and outputs the second sampled value reduced by the first sampled value as a wanted signal, wherein the control device (8) delays the sampling for the first sampled value by a predetermined delay time (D) after RESET, wherein a comparator device compares the second sampled value or the first sampled value with a threshold value (Th), and wherein, if the threshold value is exceeded, the first sampled value, preferably multiplied by a scaling factor, is outputted as the wanted signal.

2. A digital camera according to claim 1, characterized in that the following is outputted as the wanted signal in accordance with the brightness derived from the first and/or second sampled value:
   a) in a low brightness range: the difference of the sampled values;
   b) in a high brightness range: the value derived solely from the first sampled value; and
   c) in a medium brightness range: a weighted mixed value obtained from the values according to a) and b).

3. A digital camera having a CMOS image sensor (2) with a plurality of pixels each storing within an exposure time (B) a brightness-dependent charge which is outputted as a pixel signal under the control of a control device (8), and a correction device (6, 10) which, after a pixel RESET of the image sensor, forms the difference from first and second sampled values detected toward the onset and end of the exposure time for the pixel, and outputs the second sampled value reduced by the first sampled value as a wanted signal, wherein the control device (8) delays the sampling for the first sampled value by a predetermined delay time (D) after RESET, wherein the delay time (D) corresponds to about 1 percent to 20 percent, preferably 2 percent to 10 percent, of the exposure time (B), wherein a comparator device compares the second sampled value or the first sampled value with a threshold value (Th), and wherein, if the threshold value is exceeded, the first sampled value, preferably multiplied by a scaling factor, is outputted as the wanted signal.

4. A digital camera having a CMOS image sensor (2) with a plurality of pixels each storing within an exposure time (B) a brightness-dependent charge which is outputted as a pixel signal under the control of a control device (8), and a correction device (6, 10) which, after a pixel RESET of the image sensor, forms the difference from first and second sampled values detected toward the onset and end of the exposure time for the pixel, and outputs the second sampled value reduced by the first sampled value as a wanted signal, wherein the control device (8) delays the sampling for the first sampled value by a predetermined delay time (D) after RESET, wherein the first sampled value for a particular pixel is stored digitally in an image memory (10), and the stored, digital sampled value is subtracted digitally from a second, digital sampled value, wherein a comparator device compares the second sampled value or the first sampled value with a threshold value (Th), and wherein, if the threshold value is exceeded, the first sampled value, preferably multiplied by a scaling factor, is outputted as the wanted signal.

5. A digital camera having a CMOS image sensor (2) with a plurality of pixels each storing within an exposure time (B) a brightness-dependent charge which is outputted as a pixel signal under the control of a control device (8), and a correction device (6, 10) which, after a pixel RESET of the image sensor, forms the difference from first and second sampled values detected toward the onset and end of the exposure time for the pixel, and outputs the second sampled value reduced by the first sampled value as a wanted signal, wherein the control device (8) delays the sampling for the first sampled value by a predetermined delay time (D) after RESET, wherein the delay time (D) corresponds to about 1 percent to 20 percent, preferably 2 percent to 10 percent, of the exposure time (B), wherein the first sampled value for a particular pixel is stored digitally in an image memory (10), and the stored, digital sampled value is subtracted digitally from a second, digital sampled value, wherein a comparator device compares the second sampled value or the first sampled value with a threshold value (Th), and wherein, if the threshold value is exceeded, the first sampled value, preferably multiplied by a scaling factor, is outputted as the wanted signal.

6. A digital camera according to claim 3, wherein the following is outputted as the wanted signal in accordance with the brightness derived from the first and/or second sampled value:
  a) in a low brightness range: the difference of the sampled values;
  b) in a high brightness range: the value derived solely from the first sampled value; and
  c) in a medium brightness range: a weighted mixed value obtained from the values according to a) and b).

7. A digital camera according to claim 4, wherein the following is outputted as the wanted signal in accordance with the brightness derived from the first and/or second sampled value:
  a) in a low brightness range: the difference of the sampled values;
  b) in a high brightness range: the value derived solely from the first sampled value; and
  c) in a medium brightness range: a weighted mixed value obtained from the values according to a) and b).

8. A digital camera according to claim 5, wherein the following is outputted as the wanted signal in accordance with the brightness derived from the first anchor second sampled value:
  a) in a low brightness range: the difference of the sampled values;
  b) in a high brightness range: the value derived solely from the first sampled value; and
  c) in a medium brightness range: a weighted mixed value obtained from the values according to a) and b).

9. A digital camera according to claim 1, wherein a dark value offset memory (11) is provided, and an offset value belonging to a particular pixel and prestored in the dark value offset memory (11) is subtracted from the first sampled value of said pixel.

10. A digital camera according to claim 2, wherein a dark value offset memory (11) is provided, and an offset value belonging to a particular pixel and prestored in the dark value offset memory (11) is subtracted from the first sampled value of said pixel.

11. A digital camera according to claim 3, wherein a dark value offset memory (11) is provided, and an offset value belonging to a particular pixel and prestored in the dark value offset memory (11) is subtracted from the first sampled value of said pixel.

12. A digital camera according to claim 4, wherein a dark value offset memory (11) is provided, and an offset value belonging to a particular pixel and prestored in the dark value offset memory (11) is subtracted from the first sampled value of said pixel.

13. A digital camera according to claim 5, wherein a dark value offset memory (11) is provided, and an offset value belonging to a particular pixel and prestored in the dark value offset memory (11) is subtracted from the first sampled value of said pixel.

14. A digital camera according to claim 6, wherein a dark value offset memory (11) is provided, and an offset value belonging to a particular pixel and prestored in the dark value offset memory (11) is subtracted from the first sampled value of said pixel.

* * * * *